United States Patent
Choi et al.

(10) Patent No.: US 11,003,268 B2
(45) Date of Patent: May 11, 2021

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Gyeonggi-do (KR); Min Hyuk Park, Gangwon-do (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 16/357,464

(22) Filed: Mar. 19, 2019

(65) Prior Publication Data

US 2019/0286269 A1  Sep. 19, 2019

(30) Foreign Application Priority Data

Mar. 19, 2018 (KR) .................. 10-2018-0031440

(51) Int. Cl.
*G06F 3/041* (2006.01)
*G02B 5/30* (2006.01)
*G06F 3/044* (2006.01)

(52) U.S. Cl.
CPC ......... *G06F 3/0412* (2013.01); *G02B 5/3016* (2013.01); *G06F 3/0446* (2019.05); *G06F 3/0448* (2019.05); *G06F 2203/04111* (2013.01); *G06F 2203/04112* (2013.01)

(58) Field of Classification Search
CPC .... G06F 3/0412; G06F 3/0446; G06F 3/0448; G06F 3/0443; G06F 2203/04111–04112; G06F 2203/04112; G02B 5/3016
See application file for complete search history.

(56) References Cited

U.S. PATENT DOCUMENTS

| 10,095,339 | B1 * | 10/2018 | Tsai | G06F 3/0412 |
| 2011/0007020 | A1 * | 1/2011 | Hong | G06F 3/0412 345/174 |
| 2015/0029143 | A1 * | 1/2015 | Kang | G06F 1/1652 345/174 |
| 2016/0334904 | A1 * | 11/2016 | Choi | G06F 3/044 |
| 2018/0203531 | A1 * | 7/2018 | Tsai | G06F 3/0445 |
| 2019/0102015 | A1 * | 4/2019 | Kim | G06F 3/0412 |

FOREIGN PATENT DOCUMENTS

| KR | 10-2012-0075982 A | 7/2012 |
| KR | 10-2014-0092366 A | 7/2014 |
| KR | 10-2016-0029469 A | 3/2016 |

OTHER PUBLICATIONS

Notice of Allowance dated Feb. 6, 2020 from Korean Patent Office in a counterpart Korean Patent Application No. 10-2018-0031440 (all the cited references are listed in this IDS.) (English translation is submitted herewith.).

* cited by examiner

*Primary Examiner* — Liliana Cerullo
(74) *Attorney, Agent, or Firm* — The PL Law Group, PLLC (57) ABSTRACT

A touch sensor includes a base layer, first sensing electrodes arranged on the base layer along a first direction, second sensing electrodes arranged on the base layer along a second direction, first compensation electrodes on the first sensing electrodes, and second compensation electrodes on the second sensing electrodes. The first compensation electrodes entirely cover each of the first sensing electrodes in a plan view, and the second compensation entirely cover each of the second sensing electrodes in a plan view.

15 Claims, 7 Drawing Sheets

TOUCH SENSOR AND IMAGE DISPLAY DEVICE INCLUDING THE SAME

CROSS-REFERENCE TO RELATED APPLICATION AND CLAIM OF PRIORITY

This application claims the benefit under 35 USC § 119(a) of Korean Patent Application No. 10-2018-0031440 filed on Mar. 19, 2018 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including a patterned sensing electrode and an image display device including the same.

2. Description of the Related Art

As information technologies are being developed, various demands in display devices having thinner dimension, lightweight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

As a resolution of the display device become increased to a QHD (Quad High Definition) level or a UHD (Ultra High Definition) level, a high resolution is also required in the touch sensor.

For increasing a sensing resolution of the touch sensor, a critical dimension and a pitch of sensing electrodes may be decreased so that an electrode density may be increased. In this case, a resistance of each sensing electrode may be drastically increased to degrade a sensitivity of the sensing electrodes, and a transmittance of the touch sensor and the image display device may be deteriorated.

Thus, development of the touch sensor having a high touch resolution while maintaining the sensitivity and transmittance is required. For example, Korean Patent Publication No. 2014-0092366 discloses an image display device combined with a touch screen panel including a touch sensor. However, demands of a touch sensor or a touch panel with high resolution and improved electrical and optical properties are still increasing.

SUMMARY

According to an aspect of the present invention, there is provided a touch sensor having improved electrical and optical properties.

According to an aspect of the present invention, there is provided an image display device including a touch sensor having improved electrical and optical properties.

The above aspects of the present inventive concepts will be achieved by the following features or constructions:

(1) A touch sensor, comprising: a base layer; first sensing electrodes arranged on the base layer along a first direction; second sensing electrodes arranged on the base layer along a second direction; first compensation electrodes on the first sensing electrodes, the first compensation electrodes entirely covering each of the first sensing electrodes in a plan view; and second compensation electrodes on the second sensing electrodes, the second compensation electrodes entirely covering each of the second sensing electrodes in a plan view.

(2) The touch sensor according to the above (1), wherein the first sensing electrodes and the second sensing electrodes include a stack structure of a transparent conductive oxide layer and a metal layer.

(3) The touch sensor according to the above (2), wherein the first sensing electrodes and the second sensing electrodes include a sequential stack structure of a first transparent conductive oxide layer, the metal layer and a second transparent conductive oxide layer.

(4) The touch sensor according to the above (1), wherein the first compensation electrodes and the second compensation electrodes include a transparent conductive oxide.

(5) The touch sensor according to the above (1), further comprising an extended portion integrally connecting the first sensing electrodes.

(6) The touch sensor according to the above (5), further comprising an insulation pattern covering the extended portion.

(7) The touch sensor according to the above (6), further comprising a bridge portion integrally connected to the second compensation electrodes, wherein the bridge portion extends on the insulation pattern.

(8) The touch sensor according to the above (7), further comprising a compensation extended portion connected to the first compensation electrode and covering the extended portion.

(9) The touch sensor according to the above (8), wherein the compensation extended portion partially overlaps the insulation pattern.

(10) The touch sensor according to the above (9), wherein a pair of the compensation extended portions face each other on the insulation pattern with respect to the bridge portion in a plan view.

(11) The touch sensor according to the above (1), further comprising an insulation layer covering the first sensing electrodes and the second sensing electrodes, wherein the first compensation electrodes and the second compensation electrodes are disposed on the insulation layer.

(12) The touch sensor according to the above (11), further comprising: first contacts extending through the insulation layer and electrically connecting the first sensing electrodes and the first compensation electrodes with each other; and second contacts extending through the insulation layer and electrically connecting the second sensing electrodes and the second compensation electrodes with each other.

(13) The touch sensor according to the above (12), further comprising an extended portion or a protrusion extending from the first sensing electrode or the second sensing electrode, wherein the first contacts and the second contacts are arranged on the first sensing electrodes and the second sensing electrodes, and arranged on the extended portion or the protrusion.

(14) The touch sensor according to the above (1), wherein at least one of the first sensing electrode and the second sensing electrode has an oval shape or a circular shape.

(15) The touch sensor according to the above (14), further comprising an extended portion integrally connecting the first sensing electrodes and extending in a wavy shape.

(16) The touch sensor according to the above (1), wherein at least one of the first sensing electrode and the second sensing electrode has a bar shape.

(17) The touch sensor according to claim 1, further comprising: a first filling portion extending from the first compensation electrode and filling an opening formed in the first sensing electrode; and a second filling portion extending from the second compensation electrode and filling an opening formed in the second sensing electrode.

(18) A window stack structure, comprising: a window substrate; and the touch sensor according to any one of the above (1) to (17) stacked on a surface of the window substrate.

(19) The window stack structure according to the above (18), further comprising a polarizing layer disposed on the surface of the window substrate.

(20) An image display device, comprising: a display panel; and the touch sensor according to any one of the above (1) to (17) stacked on the display panel.

According to exemplary embodiments as described above, the touch sensor may include semi-transparent sensing electrodes including a transparent conductive oxide layer and a metal layer, and compensation electrodes disposed on the sensing electrodes. The compensation electrode may substantially entirely cover the sensing electrodes so that a resistance increase may be avoided even though a dimension and a pitch of the sensing electrodes may be decreased. Thus, a touch sensing of a high resolution may be realized while maintaining sensitivity.

The compensation electrode may also serve as a bridge electrode connecting the sensing electrodes to implement a sensing electrode connection and a resistance reduction.

In the touch sensor according to exemplary embodiments, an electrode area may be further achieved to reduce resistance even though an electrode pitch becomes decreased. Thus, the touch sensor may be utilized as a high resolution sensor such as a fingerprint sensor.

DETAILED DESCRIPTION

According to exemplary embodiments of the present invention, there is provided a touch sensor which may include a plurality of sensing electrodes, and compensation electrodes entirely covering the sensing electrodes in a plan view and providing a bridge. An image display device including the touch sensor and having improved transmittance and resolution is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
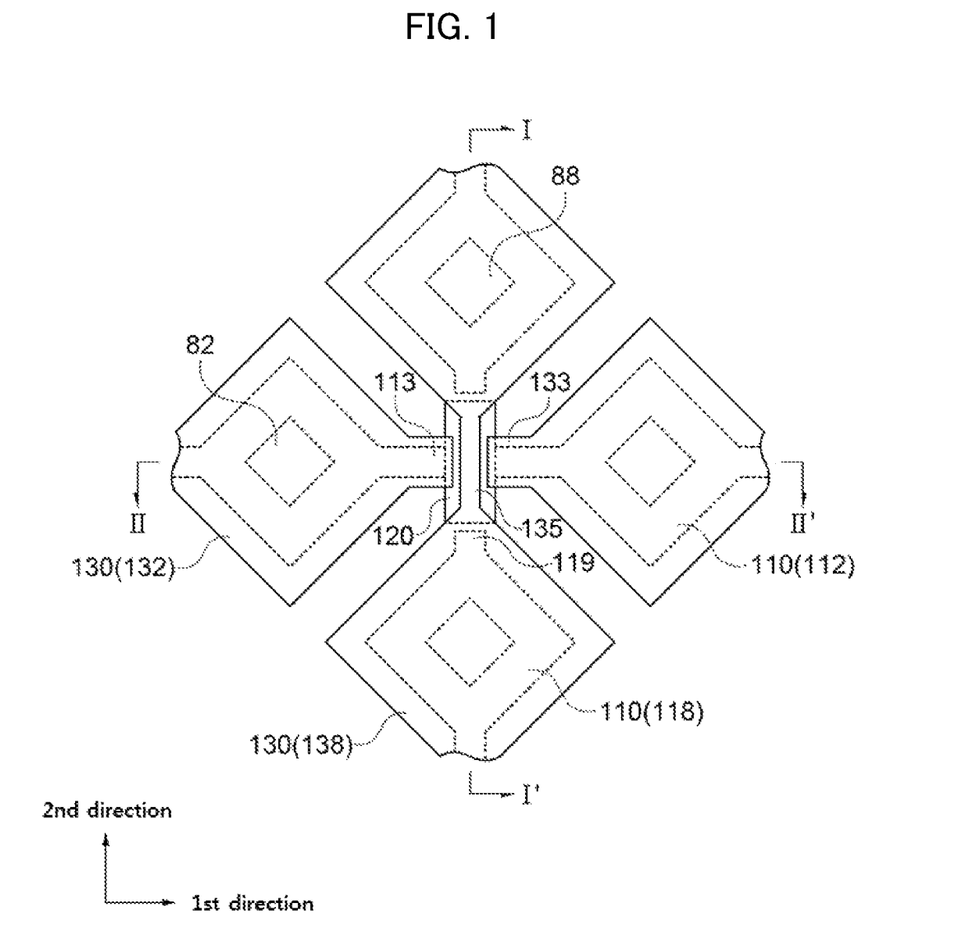
FIG. 1 is a schematic top plan view illustrating a touch sensor in accordance with exemplary embodiments.
Figure 2:
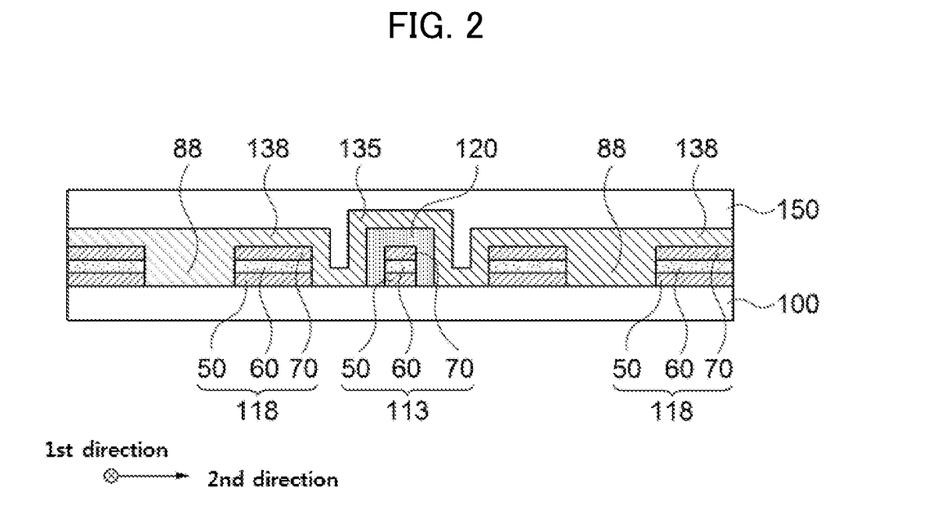
FIGS. 2 and 3 are schematic cross-sectional views illustrating a touch sensor in accordance with exemplary embodiments.
Figure 3:
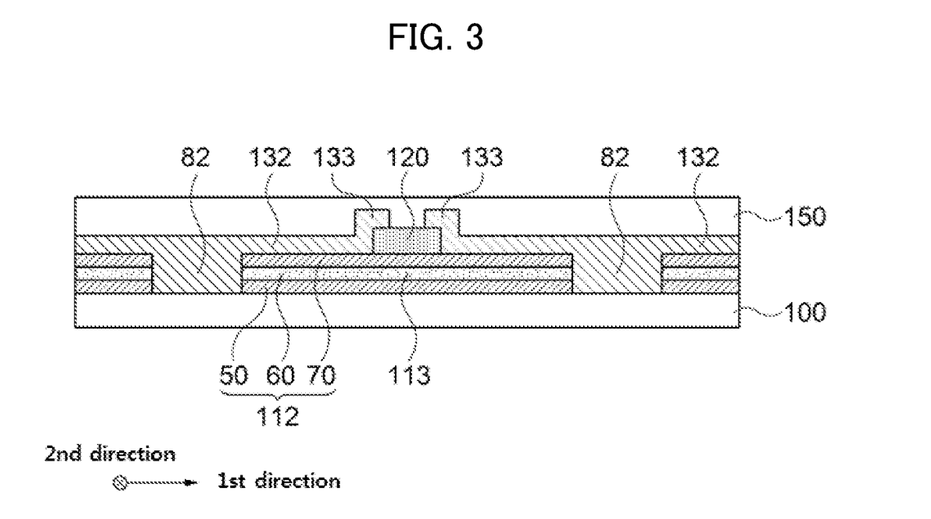

FIG. 1 is a schematic top plan view illustrating a touch sensor in accordance with exemplary embodiments. FIGS. 2 and 3 are schematic cross-sectional views illustrating a touch sensor in accordance with exemplary embodiments.

Specifically, FIGS. 2 and 3 are cross-sectional views taken along lines I-I' and II-II' of FIG. 1, respectively, in a thickness direction. For convenience of descriptions, illustration of a base layer and a passivation layer is omitted in FIG. 1.

Referring to FIGS. 1 to 3, the touch sensor may include a base layer 100, sensing electrodes 110 and compensation electrodes 130.

The base layer 100 may serve as a supporting layer for formation of the sensing electrodes 110. The base layer 100 may include any lower member for the sensing electrode 110. For example, the base layer 100 may include a film-type substrate or an object (e.g., a display panel of an image display device) on which the sensing electrodes 110 are formed.

For example, the base layer 100 may include glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate (polyallylate), polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

The sensing electrodes 110 may be disposed on a top surface of the base layer 100, and may include first sensing electrodes 112 and second sensing electrodes 118.

The first sensing electrodes 112 may be arranged along a first direction (e.g., an X-axis direction). Accordingly, a first sensing electrode row extending in the first direction may be defined by the first sensing electrodes 112. A plurality of the first sensing electrode rows may be arranged along a second direction.

The second sensing electrodes 118 may be arranged along the second direction (e.g., a Y-axis direction). Accordingly, a second sensing electrode column extending in the second direction may be formed by the second sensing electrodes 118. Further, a plurality of the second sensing electrode columns may be arranged along the first direction.

For example, the first sensing electrode 112 and the second sensing electrode 118 may each have a polygonal shape such as a rhombus shape as illustrated in FIG. 1. However, the shape of the first sensing electrode 112 and the second sensing electrode 118 may be properly modified in consideration of a patterning process convenience, a desired touch resolution, etc.

In some embodiments, a plurality of the first sensing electrodes 112 may be physically and electrically connected along the first direction continuously via an extended portion 113. In an embodiment, the first sensing electrode 112 and the extended portion 113 may be integrally connected as a substantially unitary member.

In some embodiments, each second sensing electrode 118 may be an island-type pattern. In an embodiment, the second sensing electrode 118 may include a protrusion 119 extending in the second direction.

The second sensing electrodes 118 may be spaced apart from each other with respect to an insulation pattern 120. As illustrated in FIG. 1, an extension between the neighboring second sensing electrodes 118 may be cut by the insulation pattern 120 such that the protrusion 119 may be provided.

In an embodiment, the protrusion 119 may be omitted. For example, the second sensing electrodes 118 having the rhombus shape may face each other with respect to the insulation pattern 120.

An insulation pattern 120 may have an island pattern shape selectively covering an extended portion 113 between the neighboring second sensing electrodes 118 on the base layer 100. The insulation pattern 120 may include an inorganic insulation material such as silicon oxide, or a transparent organic material such as an acryl-based resin.

In exemplary embodiments, the sensing electrode 110 may have a multi-layered structure including a transparent conductive oxide layer and a metal layer. In an embodiment, the sensing electrode 110 may include a first transparent conductive oxide layer 50, a metal layer 60 and a second transparent conductive oxide layer 70 sequentially stacked from a top surface of the base layer 100. In an embodiment, the sensing electrode may be semi-transparent and may have a triple-layered structure.

The first transparent conductive oxide layer 50 and the second transparent conductive oxide layer 70 may include a conductive metal oxide, e.g., indium tin oxide (ITO), indium zinc oxide (IZO), indium zinc tin oxide (IZTO), aluminum zinc oxide (AZO), zinc oxide (ZnOx), indium oxide (InOx), tin oxide (SnOx), cadmium tin oxide (CTO), gallium-doped zinc oxide (GZO), zinc tin oxide (ZTO), indium gallium oxide (IGO), etc. These may be used alone or in a combination thereof.

The metal layer may include a metal such as gold (Au), silver (Ag), copper (Cu), aluminum (Al), platinum (Pt), palladium (Pd), chromium (Cr), tungsten (W), titanium (Ti), tantalum (Ta), iron (Fe), cobalt (Co), nickel (Ni), zinc (Zn), tellurium (Te), vanadium (V), niobium (Nb), tin (Sn), molybdenum (Mo), or an alloy thereof (e.g., silver-palladium-copper (APC)). In an embodiment, the metal layer 60 may include APC for achieving low resistance and high sensitivity.

The metal layer 60 may be inserted at a central portion of the sensing electrode 110, so that a channel resistance via the sensing electrode 110 may be reduced, and sensitivity and flexibility may be enhanced.

The first transparent conductive oxide layer 50 and the second transparent conductive oxide layer 70 may be formed on lower and upper surfaces of the metal layer 60, respectively, so that damages and corrosion of the metal layer 60 may be prevented, and transmittance of the touch sensor may be improved.

As described above, the sensing electrode 110 may be formed as, e.g., a semi-transparent electrode including the transparent conductive oxide layer and the metal layer, and may provide a charge path for reducing resistance.

The extended portion 113 and the protrusion 119 may have a substantially the same stack structure as that of the sensing electrode 110.

The compensation electrodes 130 may be disposed on the sensing electrodes 110. In exemplary embodiments, the compensation electrode 130 may entirely cover each sensing electrode 110 in a plan view. The compensation electrode 130 may include a first compensation electrode 132 and a second compensation electrode 138.

The first compensation electrode 132 may each cover the first sensing electrode 112. A plurality of the first compensation electrodes 132 may be arranged along the first direction based on an arrangement of the first sensing electrodes 112.

The first compensation electrode 132 may have a shape substantially the same as or similar to that of the first sensing electrode 112 (e.g., a rhombus shape), and a plurality of the first compensation electrodes 132 may be arranged along the first direction to be physically separated from each other.

In some embodiments, a compensation extended portion 133 may be formed at one end in the first direction of the first compensation electrode 132. The compensation extended portion 133 may be substantially integrally connected to the first compensation electrode 132, and may overlap the extended portion 113 connected to the first sensing electrode 112.

As illustrated in FIGS. 1 and 3, the compensation extended portion 133 may partially overlap a top surface of the insulation pattern 120. The compensation extended portions 133 connected to different first compensation electrodes 132 neighboring in the first direction may be spaced apart from each other in the first direction on the top surface of the insulation pattern 120.

The second compensation electrode 138 may each cover the second sensing electrode 118. A plurality of the second compensation electrodes 138 may be arranged along the second direction based on an arrangement of the second sensing electrodes 118. The second compensation electrode 138 may have a shape substantially the same as or similar to that of the second sensing electrode 118 (e.g., a rhombus shape).

In some embodiments, the second compensation electrodes 138 may be continuously connected to each other along the second direction via a bridge portion 135. The bridge portion 135 may be integrally connected to the second compensation electrodes 138, and may be a substantially unitary member with the second compensation electrodes 138.

As illustrated in FIGS. 1 and 2, the bridge portion 135 may extend in the second direction on the insulation pattern 120 to physically and electrically connect the second compensation electrodes 138.

As illustrated in FIG. 1, the bridge portion 135 may extend on a central portion of the insulation pattern 120, and a pair of the compensation extended portions 133 may face each other with respect to the bridge portion 135. As described above, the compensation extended portion 133 may completely cover the extended portion 113 in a plan view and may partially overlap the insulation pattern 120.

The compensation extended portion 133 may entirely cover the extended portion 113 so that etching damages or disconnection of the first sensing electrode 112 or the extended portion 113 may be prevented during an etching process for forming the first compensation electrode 132.

Additionally, the compensation extended portion 133 and the bridge portion 135 may overlap the insulation pattern 120. Thus, a capacitance generation around the insulation pattern 120 may be facilitated so that touch sensitivity may be enhanced. In some embodiments, the insulation pattern 120 may extend to overlap end portions of the second compensation electrodes 138 facing each other with respect to the bridge portion 135. Thus, an area capable of generating the capacitance may be further increased.

As illustrated in FIGS. 2 and 3, the compensation electrodes 132 and 138 may be in direct contact with the sensing electrodes 112 and 118. The compensation electrodes 132 and 138 may be also in direct contact with the insulation pattern 120. A passivation layer 150 may be formed on the compensation electrodes 132 and 138 and the insulation pattern 120.

According to exemplary embodiments as described above, the compensation electrodes 130 may entirely cover the sensing electrodes 110 so that the channel resistance may be reduced to obtain sufficient sensitivity.

For example, in a touch sensor with high sensitivity capable of sensing a fingerprint, a pitch of sensing electrodes is controlled to be comparable to a crest and a trough of the fingerprint. In this case, the pitch of the sensing electrodes may be decreased to a level of about 50 µm to about 150 µm, and a capacitance between the sensing electrodes may be decreased to a level of about 1 fF to about 1,000 fF. Accordingly, a ratio of a signal relative to a noise (SNR) may be decreased by a signal of a mobile device such as an image display device or an external noise, and a fingerprint sensing with high resolution may not be easily implemented.

Further, a material having a low transmittance may be used for reducing a resistance of the sensing electrodes and an electrode area may be expanded for obtaining the sufficient capacitance. In this case, an entire transmittance of the touch sensor may be degraded.

However, according to exemplary embodiments, the compensation electrodes 130 may be formed to be electrically connected to the sensing electrodes 110 and to have a greater area that that of the sensing electrodes 110. Thus, a channel resistance increase due to a reduction of an electrode pitch or width may be suppressed. Thus, a reduction of the capacitance in a high resolution sensor such as a fingerprint sensor may be prevented and a sufficient sensing area may be obtained.

Additionally, the compensation electrode 130 may form a parallel connection with the sensing electrodes 110 to further reduce the channel resistance.

In an embodiment, the compensation electrodes 130 may be formed of a transparent conductive oxide such as ITO so that a transmittance of the touch sensor may be also enhanced by the compensation electrodes 130.

In exemplary embodiments, the bridge portion 135 electrically connecting the second sensing electrodes 118 separated from each other may be formed together with the second compensation electrode 138 (e.g., by the same etching process). Thus, an electrical connection may be implemented without forming an additional bridge electrode or a bridge pattern while also reducing the resistance and improving the transmittance.

In some embodiments, an opening may be formed through each sensing electrode 110, and the compensation electrode 130 may be formed in each opening to form filling portions 82 and 88.

A first filling portion 82 may be formed in the first sensing electrode 112 from the first compensation electrode 132. A second filling portion 88 may be formed in the second sensing electrode 118 from the second compensation electrode 138.

For example, the opening may be formed in the sensing electrode 110 having a semi-transparent structure, and the filling portions 82 and 88 including the transparent conductive oxide such as ITO may be formed in the opening to further improve the transmittance of the touch sensor.

For example, the openings or the filling portions 82 and 88 may have a shape substantially the same as or similar to that of the sensing electrode 110 (e.g., a rhombus shape in a plan view).

Figure 4:
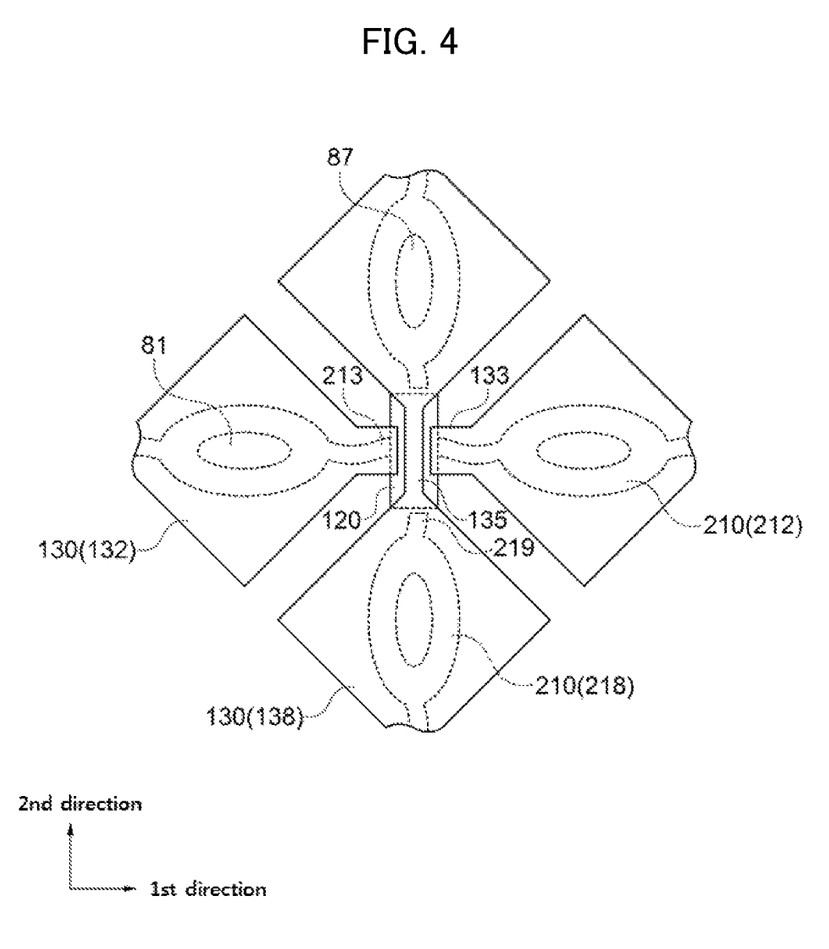
FIGS. 4 and 5 are schematic top plan views illustrating touch sensors in accordance with some exemplary embodiments.
Figure 5:
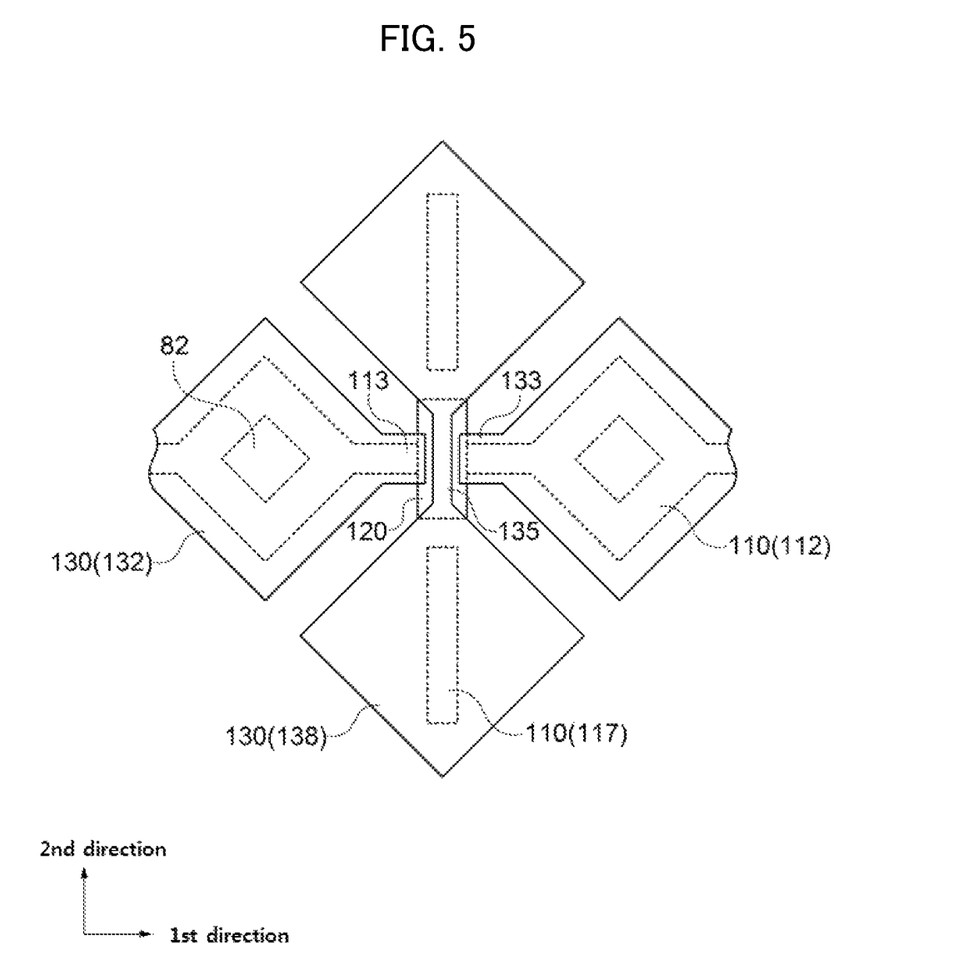

FIGS. 4 and 5 are schematic top plan views illustrating touch sensors in accordance with some exemplary embodiments. Detailed descriptions on elements and structures substantially the same as or similar to those described with reference to FIGS. 1 to 3 are omitted herein, and like reference numerals are used to designate like elements.

Referring to FIG. 4, the touch sensor may include sensing electrodes including a first sensing electrode 212 and a second sensing electrode 218. As described above, compensation electrodes 130 may be disposed on the sensing electrodes 210, and may entirely cover the sensing electrodes 210 in a plan view.

In exemplary embodiments, the sensing electrode 210 may have an oval shape or a circular shape. For example, the first sensing electrode 212 may have an oval shape having a long axis (or a major axis) in the first direction, and the second sensing electrode 218 may have an oval shape having a long axis (or a major axis) in the second direction. The long axis may be aligned according to an arrangement direction of each sensing electrode 210 so that a flow of a channel or a sensing signal may be promoted.

Further, a periphery of the sensing electrode 210 may have a curved shape so that a moire phenomenon caused by a regular overlap with electrodes included in a display panel or a thin film transistor (TFT) panel under the touch sensor may be reduced or avoided.

In some embodiments, an extended portion 213 connected to the first sensing electrode 212 may extend in a wavy shape so that a moire phenomenon may be further prevented. A protrusion 219 connected to the second sensing electrode 218 may also have a wavy shape.

In an embodiment, the compensation electrode 130 may be patterned as an oval shape or a circular shape having a curved periphery.

In some embodiments, an opening may be formed in each sensing electrode 210, and filling portions 81 and 87 may be formed in the openings from the compensation electrodes 130. The filling portions 81 and 87 may have a shape substantially the same as or similar to that of the sensing electrodes 210 (e.g., the oval shape).

Referring to FIG. 5, at least one of sensing electrodes 110 may have a bar shape having a relatively narrow width.

For example, a first sensing electrode 112 may have a shape substantially the same as that illustrated with reference to FIG. 1. A second sensing electrode 117 may have the bar shape covered by the second compensation electrode 138.

The second sensing electrode 117 may be formed as the bar shape so that a transmittance may be improved and a dimension of an electrode pattern may be further decreased. A channel resistance increase may be alleviated or suppressed by the second compensation electrode 138 covering the second sensing electrode 117.

In an embodiment, an opening may be formed through the first sensing electrode 112, and a first filling portion 82 may be formed in the opening from the first compensation electrode 132.

Figure 6:
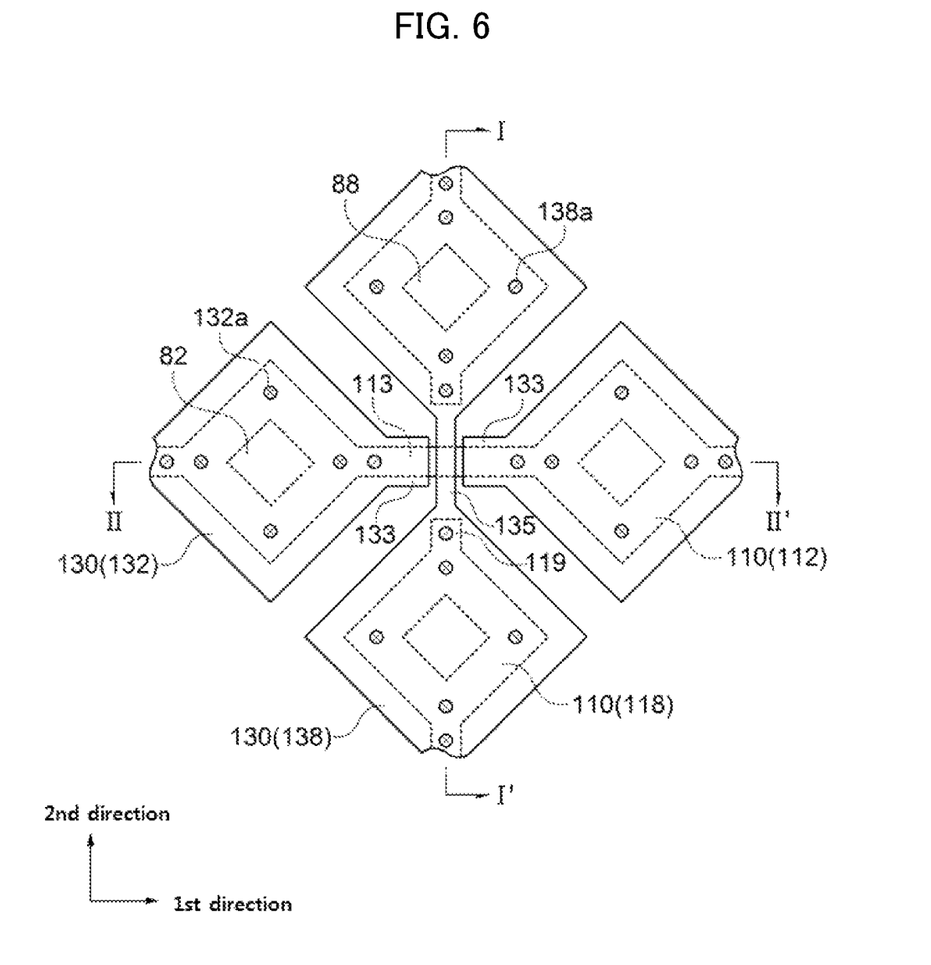
FIG. 6 is a schematic top plan view illustrating a touch sensor in accordance with exemplary embodiments
Figure 7:
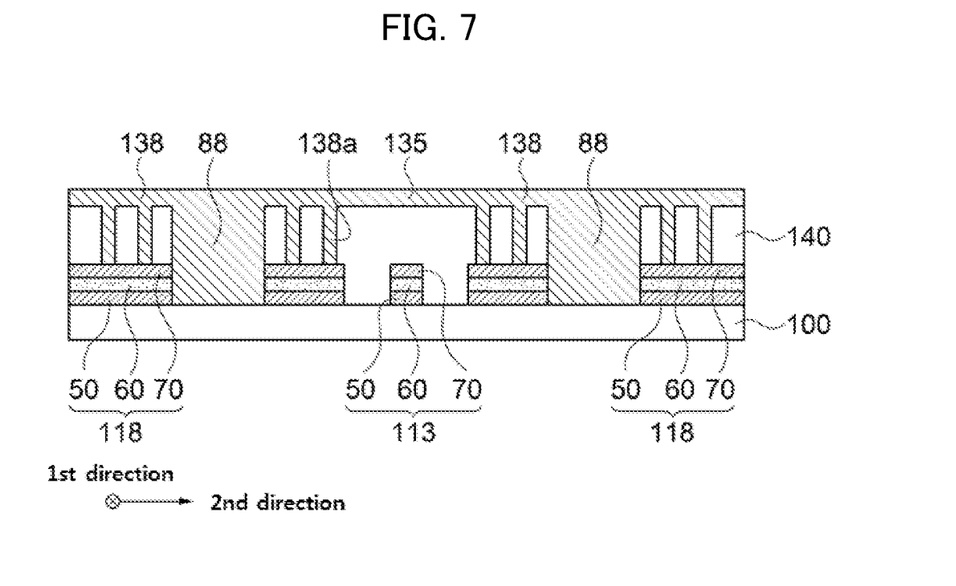
FIGS. 7 and 8 are schematic cross-sectional views illustrating a touch sensor in accordance with exemplary embodiments.
Figure 8:
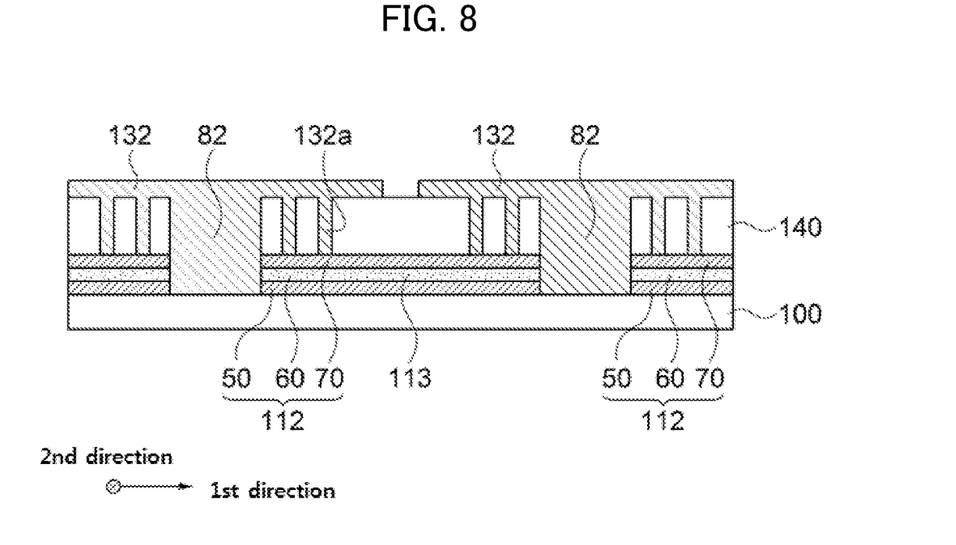

FIG. 6 is a schematic top plan view illustrating a touch sensor in accordance with exemplary embodiments. FIGS. 7 and 8 are schematic cross-sectional views illustrating the touch sensor in accordance with exemplary embodiments. Detailed descriptions on elements and structures substantially the same as or similar to those described with reference to FIGS. 1 to 3 are omitted herein.

Specifically, FIGS. 7 and 8 are cross-sectional views taken along lines I-I' and II-II' of FIG. 6, respectively, in a thickness direction.

Referring to FIGS. 6 to 8, as described with reference to FIGS. 1 to 3, the compensation electrodes 130 including the first compensation electrode 132 and the second compensation electrode 138 may cover the sensing electrodes 110 including the first sensing electrode 112 and the second sensing electrode 118 in a plan view.

In exemplary embodiments, an insulation layer 140 may be formed between the sensing electrodes 110 and the compensation electrodes 130, and the sensing electrodes 110 and the compensation electrodes 130 may be electrically connected to each other through contacts 132a and 138a that may be formed through the insulation layer 140.

For example, the insulation layer 140 may serve as an over-coating layer or a planarization layer entirely covering the sensing electrodes 110 on the base layer 100. The insulation layer 140 may be formed of an inorganic insulation material such as silicon oxide or a transparent organic material such as an acryl-based resin.

In some embodiments, after the formation of the insulation layer 140, the insulation layer 140 may be partially etched to form contact holes through which top surfaces of the sensing electrodes 110 may be partially exposed. A compensation electrode layer filling the contact holes may be formed on the insulation layer 140, and then the compensation electrode layer may be patterned. Accordingly, the compensation electrodes 130 and the contacts 132a and 138a may be substantially simultaneously formed.

As illustrated in FIGS. 6 and 8, the first compensation electrode 132 may be electrically connected to the first sensing electrode 112 via the first contact 132a. As illustrated in FIGS. 6 and 7, the second compensation electrode 138 may be electrically connected to the second sensing electrode 118 via the second contact 138a.

In some embodiments, a plurality of the contacts may be arranged between one compensation electrode 130 and one sensing electrode 110. Thus, a contact resistance between the compensation electrode 130 and the sensing electrode 110 may be reduced so that a suppression of a resistance increase may be further effectively realized.

For example, as illustrated in FIG. 6, the contacts 132a and 138a may be formed at each vertex region of the sensing electrode 110. Further, the first contact 132a may be also formed on the extended portion 113 connected to the first sensing electrode 112. The second contact 138a may be also formed on the protrusion 119 connected to the second sensing electrode 118.

In an embodiment, the contacts 132a and 138a may be arranged around the filling portions 82 and 88 formed in the openings through the sensing electrodes 110. For example, the filling portions 82 and 88 may extend from the compensation electrodes 130 to extend through the insulation layer 140 and the sensing electrode 110. A plurality of the first contacts 132a may be arranged around the first filling portion 82 to electrically connect the first compensation electrode 132 and the first sensing electrode 112 to each other. A plurality of the second contacts 138a may be arranged around the second filling portion 88 to electrically connect the second compensation electrode 138 and the second sensing electrode 118 to each other.

FIG. 6 only illustrates an example arrangement of the contacts, and the arrangement of the contacts may be properly modified or adjusted in consideration of a reduction of a channel resistance and a pattern dimension.

The touch sensor according to exemplary embodiments as described above may be manufactured by a lamination process or a transfer process.

For example, the touch sensor as described above may be formed on a carrier substrate. In some embodiments, traces may be formed from each of sensing electrode rows and sensing electrode columns, and pad electrodes connected to the traces may be formed on a peripheral portion of the touch sensor.

The touch sensor may be detached from the carrier substrate, and then may be transferred to a protective film. In this case, the base layer 100 may include a separation layer for facilitating the detachment from the carrier substrate.

In an embodiment, a thermal curing and/or light curing process may be further performed to increase a mechanical strength of the touch sensor.

According to exemplary embodiments, a touch screen panel including the touch sensor is provided. For example, elements or structures well known in the related art may be added to the touch sensor to obtain the touch screen panel.

According to exemplary embodiments, an image display device including the touch sensor or the touch screen panel is provided.

Figure 9:
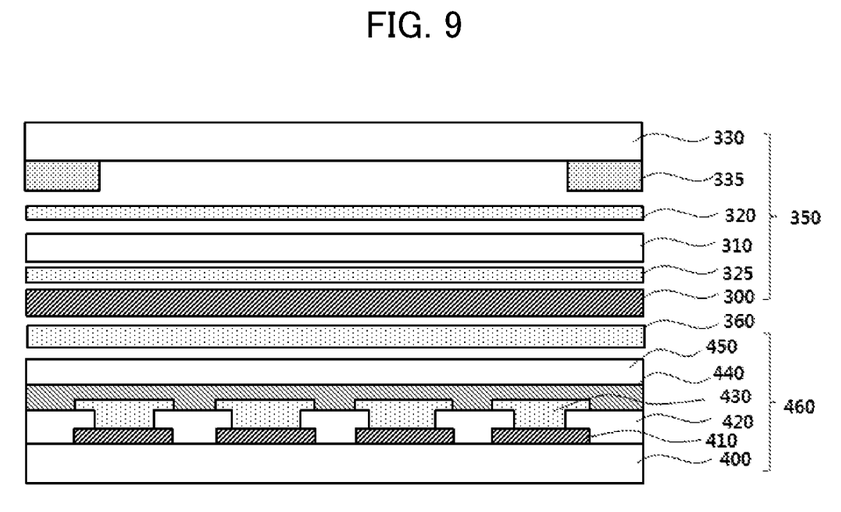
FIG. 9 is a schematic view illustrating a window stack structure and an image display device in accordance with exemplary embodiments.

FIG. 9 is a schematic view illustrating a window stack structure and an image display device in accordance with exemplary embodiments. A window stack structure 350 may include a window substrate 330, a polarizing layer 310 and a touch sensor 300 according to exemplary embodiments as described above.

The window substrate 330 may include, e.g., a hard coating film. In an embodiment, a light-shielding pattern 335 may be formed on a peripheral portion of a surface of the window substrate 33. The light-shielding pattern 335 may include a color-printed pattern, and may have a single-layered or a multi-layered structure. A bezel portion or a non-display region of the image display device may be defined by the light-shielding pattern 335.

The polarizing layer 310 may include a coating-type polarizer or a polarizing plate. The coating-type polarizer may include a liquid crystal coating layer that may include a cross-linkable liquid crystal compound and a dichroic dye. In this case, the polarizing layer 310 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 310 may be directly attached to the surface of the window substrate 330 or may be attached via a first adhesive layer 320.

The touch sensor 300 may be included in the window stack structure 350 as a film or a panel. In an embodiment, the touch sensor 300 may be combined with the polarizing layer 310 via a second adhesive layer 325.

As illustrated in FIG. 9, the window substrate 330, the polarizing layer 310 and the touch sensor 300 may be sequentially positioned from a viewer's side. In this case, sensing electrodes of the touch sensor 300 may be disposed under the polarizing layer 310 so that electrode patterns may be effectively prevented from being seen by the viewer.

If the touch sensor 300 includes a substrate, the substrate may include, e.g., triacetyl cellulose, cycloolefin, cycloolefin copolymer, polynorbornene copolymer, etc., and may have an in-plane retardation of ±2.5 nm or less.

In an embodiment, the touch sensor 300 may be directly transferred to the window substrate 330 or the polarizing layer 310. In an embodiment, the window substrate 330, the touch sensor 300 and the polarizing layer 310 may be sequentially positioned from the viewer's side.

The image display device may include a display panel 460 and the window stack structure 350 disposed on the display panel.

The display panel 460 may include a pixel electrode 410, a pixel defining layer 420, a display layer 430, an opposing electrode 440 and an encapsulation layer 450 disposed on a panel substrate 400.

A pixel circuit including a thin film transistor (TFT) may be formed on the panel substrate 400, and insulation layer covering the pixel circuit may be formed. The pixel electrode 410 may be electrically connected to, e.g., a drain electrode of the TFT on the insulation layer.

The pixel defining layer 420 may be formed on the insulation layer, and the pixel electrode 410 may be exposed through the pixel defining layer 420 such that a pixel region may be defined. The display layer 430 may be formed on the pixel electrode 410, and the display layer 430 may include, e.g., a liquid crystal layer or an organic light emitting layer.

The opposing electrode 440 may be disposed on the pixel defining layer 420 and the display layer 430. The opposing electrode 440 may serve as, e.g., a common electrode or a cathode of the image display device. The encapsulation layer 450 may be disposed on the opposing electrode 440 to protect the display panel 460.

In some embodiments, the display panel 460 and the window stack structure 350 may be combined with each other through an adhesive layer 360. For example, a thickness of the adhesive layer 360 may be greater than each thickness of the first adhesive layer 320 and the second adhesive layer 325. A viscoelasticity of the adhesive layer 360 may be about 0.2 MPa or less at a temperature ranging from −20° C. to 80° C. In this case, a noise from the display panel may be blocked, and an interface stress while being bent may be alleviated so that damages of the window stack structure 350 may be avoided. In an embodiment, the viscoelasticity of the adhesive layer 360 may be in a range from about 0.01 MPa to about 0.15 MPa.

As a resolution of the image display device becomes greater, a pixel size is also decreased, and a dimension or a pitch of electrodes in the touch sensor may be also decreased. According to exemplary embodiments of the present invention, low channel resistance and high transmittance of the touch sensor may be achieved while maintaining high resolution by using the compensation electrode, and the touch sensor having high sensitivity with increased electrode area and capacitance may be implemented in the image display device. For example, the touch sensor may be effectively applied to a fingerprint sensor of high resolution.

In some embodiments, the sensing electrodes 110 and 210, and the compensation electrodes 130 may be arranged and patterned according to a shape and an arrangement of a pixel region in the display panel so that a moire phenomenon due to an overlap with the display panel may be reduced.

What is claimed is:

1. A touch sensor, comprising:
a base layer;
first sensing electrodes arranged on the base layer along a first direction;
second sensing electrodes arranged on the base layer along a second direction;
first compensation electrodes on the first sensing electrodes, wherein each of the first compensation electrodes has a greater area than that of each of the first sensing electrodes in a plan view to entirely cover each of the first sensing electrodes; and
second compensation electrodes on the second sensing electrodes, wherein each of the second compensation electrodes has a greater area than that of each of the second sensing electrodes in a plan view to entirely cover each of the second sensing electrodes,
wherein each of the first sensing electrodes and the second sensing electrodes includes a stack structure of a transparent conductive oxide layer and a metal layer;
each of the first compensation electrodes directly contacts an entire top surface of each of the first sensing electrodes, and each of the second compensation electrodes directly contacts an entire top surface of each of the second sensing electrodes; and
the first compensation electrodes and the second compensation electrodes comprise a transparent conductive oxide.

2. The touch sensor according to claim 1, wherein each of the first sensing electrodes and the second sensing electrodes includes a sequential stack structure of a first transparent conductive oxide layer, the metal layer and a second transparent conductive oxide layer.

3. The touch sensor according to claim 1, further comprising an extended portion integrally connecting the first sensing electrodes.

4. The touch sensor according to claim 3, further comprising an insulation pattern covering the extended portion.

5. The touch sensor according to claim 4, further comprising a bridge portion integrally connected to the second compensation electrodes, the bridge portion extending on the insulation pattern.

6. The touch sensor according to claim 5, further comprising a compensation extended portion connected to the first compensation electrode and covering the extended portion.

7. The touch sensor according to claim 6, wherein the compensation extended portion overlaps the insulation pattern.

8. The touch sensor according to claim 7, wherein a pair of the compensation extended portions face each other on the insulation pattern with respect to the bridge portion in a plan view.

9. The touch sensor according to claim 1, wherein at least one of the first sensing electrode and the second sensing electrode has an oval shape or a circular shape.

10. The touch sensor according to claim 9, further comprising an extended portion integrally connecting the first sensing electrodes and extending in a wavy shape.

11. The touch sensor according to claim 1, wherein at least one of the first sensing electrode and the second sensing electrode has a bar shape.

12. The touch sensor according to claim 1, further comprising:
a first filling portion extending from the first compensation electrode and filling an opening formed in the first sensing electrode; and
a second filling portion extending from the second compensation electrode and filling an opening formed in the second sensing electrode.

13. A window stack structure, comprising:
a window substrate; and
the touch sensor according to claim 1 stacked on a surface of the window substrate.

14. The window stack structure according to claim 13, further comprising a polarizing layer disposed on the surface of the window substrate.

15. An image display device, comprising:
   a display panel; and
   the touch sensor according to claim 1 stacked on the display panel.

* * * * *